(12) United States Patent
Kleiman et al.

(10) Patent No.: US 7,130,873 B2
(45) Date of Patent: Oct. 31, 2006

(54) FILE SYSTEM IMAGE TRANSFER BETWEEN DISSIMILAR FILE SYSTEMS

(75) Inventors: Steven R. Kleiman, Los Altos, CA (US); David Hitz, Los Altos, CA (US); Norman Hutchinson, Richmond (CA); Sean O'Malley, Tucson, AZ (US)

(73) Assignee: Network Appliance Inc., Sunnyvale, CA (US)

( * ) Notice: Subject to any disclaimer, the term of this patent is extended or adjusted under 35 U.S.C. 154(b) by 430 days.

(21) Appl. No.: 10/452,795

(22) Filed: Jun. 2, 2003

(65) Prior Publication Data

US 2003/0217082 A1    Nov. 20, 2003

Related U.S. Application Data

(63) Continuation of application No. 09/426,409, filed on Oct. 25, 1999, now Pat. No. 6,574,591, which is a continuation-in-part of application No. 09/127,497, filed on Jul. 31, 1998, now Pat. No. 6,604,118.

(51) Int. Cl.
*G06F 12/00* (2006.01)
*G06F 17/30* (2006.01)

(52) U.S. Cl. ............................ 707/203; 707/204
(58) Field of Classification Search ........ 707/203–204, 707/200; 711/1
See application file for complete search history.

(56) References Cited

U.S. PATENT DOCUMENTS

| | | | |
|---|---|---|---|
| 4,742,450 A | 5/1988 | Duvall et al. | |
| 4,825,354 A | 4/1989 | Agrawal et al. | |
| 4,878,167 A | 10/1989 | Kapulka et al. | |
| 5,163,148 A | 11/1992 | Walls | |
| 5,276,867 A | 1/1994 | Kenley et al. | |
| 5,313,646 A | 5/1994 | Hendricks et al. | |

(Continued)

FOREIGN PATENT DOCUMENTS

WO    WO 01/31446 A1    3/2001

OTHER PUBLICATIONS

Charlton. "Maintaining consistency in a replicated software archive." Software-Practice and Experience, vol. 28(3), 285-295, Mar. 1998, John Wiley & Sons.

*Primary Examiner*—Alford W. Kindred
(74) *Attorney, Agent, or Firm*—Blakely Sokoloff Taylor & Zafman LLP

(57) ABSTRACT

The invention provides techniques for duplicating all or part of a file system while maintaining consistent copies of the file system. A preferred embodiment reads data from the source file system (mapped according to a first storage block arrangement) creates an image stream and writes this data onto the destination file system (in accordance with a second storage block arrangement). Thus, the invention allows an image transfer between file systems that have dissimilar characteristics. An intermediate storage medium can be used to store or transmit the data read from the source file system before writing the data to the destination file system. (For example, the intermediate storage medium can include a magnetic tape or other archival device, or a network.) Another aspect of the invention writes the data to the intermediate storage medium using a normalized or implied block list. The information is read from the intermediate storage medium using normalized or implied block list and written to the destination file system according to the second storage block arrangement. Another aspect of the invention is that the invention determines a first set of block numbers (BNs), determines where the blocks referenced by these BNs are to be stored, and updates the BNs accordingly.

42 Claims, 10 Drawing Sheets

U.S. PATENT DOCUMENTS

| | | |
|---|---|---|
| 5,721,916 A | 2/1998 | Pardikar |
| 5,819,292 A * | 10/1998 | Hitz et al. .................. 707/203 |
| 5,873,101 A * | 2/1999 | Klein .......................... 707/204 |
| 5,876,278 A * | 3/1999 | Cheng ........................ 454/184 |
| 6,145,121 A * | 11/2000 | Levy et al. ................. 717/135 |
| 6,289,356 B1 * | 9/2001 | Hitz et al. .................. 707/201 |
| 6,574,591 B1 | 6/2003 | Kleiman et al. |
| 2001/0044807 A1 | 11/2001 | Kleiman et al. |
| 2002/0049718 A1 | 4/2002 | Kleiman et al. |

* cited by examiner

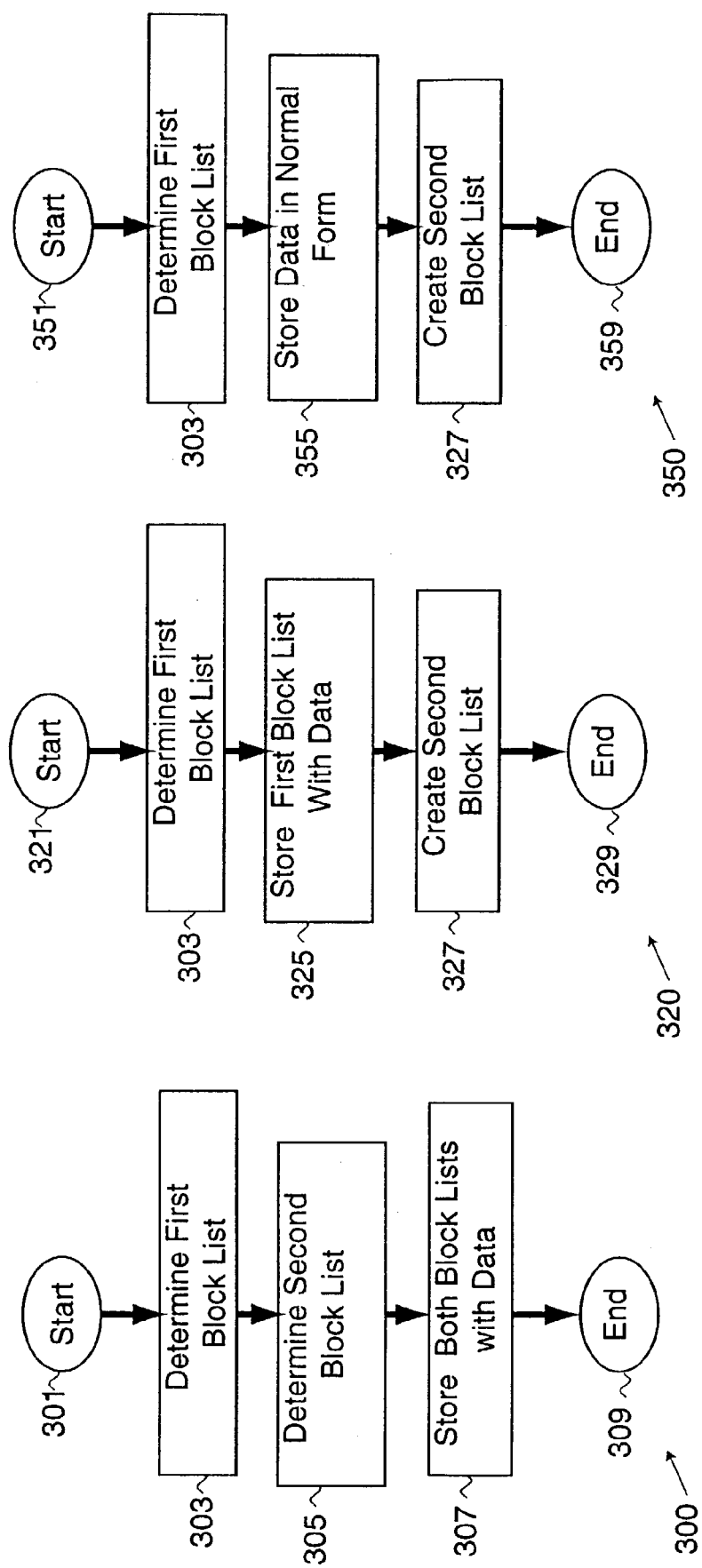

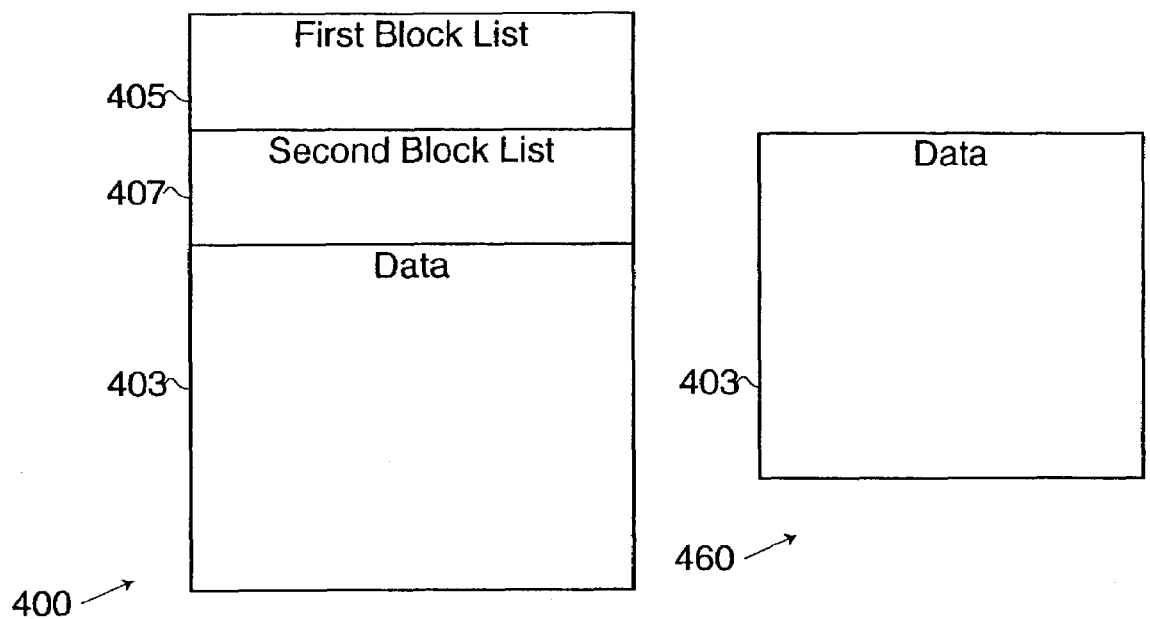
Fig. 4A
Fig. 4C
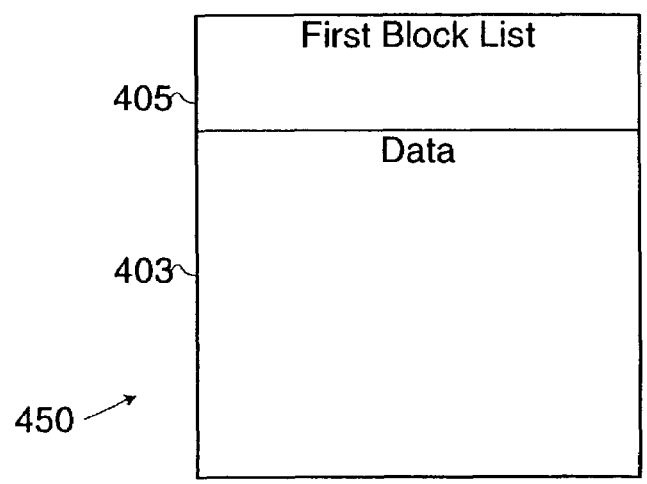
Fig. 4B

FILE SYSTEM IMAGE TRANSFER BETWEEN DISSIMILAR FILE SYSTEMS

This application is a continuation of prior U.S. patent application Ser. No. 09/426,409, entitled: File System Image Transfer Between Dissimilar File Systems, by Steve Kleiman et al., filed Oct. 25, 1999, now U.S. Pat. No. 6,574,591, which is a continuation-in-part of prior U.S. patent application Ser. No. 09/127,497, entitled: File System Image Transfer, by Steve Kleiman et al., filed Jul. 31, 1998, now U.S. Pat. No. 6,604,118, hereby incorporated by reference in its entirety.

BACKGROUND OF THE INVENTION

1. Field of the Invention

The invention relates to storage systems.

2. Background

In computer file systems for storing and retrieving information, it is sometimes advantageous to duplicate all or part of the file system. For example, one purpose for duplicating a file system is to maintain a backup copy of the file system to protect against lost information. Another purpose for duplicating a file system is to provide a replica of the file system at multiple servers so that the multiple servers can share the load incurred in accessing the available information.

One known problem in the prior art is that existing techniques for duplicating data in a file system are either relatively awkward and slow (such as duplicating to tape), or are relatively expensive (such as duplicating to an additional set of disk drives).

The previously referenced application discloses how to efficiently copy data contained in the storage blocks of the source file system to the storage blocks on the destination file system where each file system has the same block numbers (BNs) identifying the storage blocks (thus, making an identical image copy of the source file system on the destination file system). The previously referenced application required that the BNs for the source file system and the BNs for the destination file system be the same.

A problem can exist when the destination file system is smaller than the source file system as not all the possibly-used storage blocks in the source file system are available on the destination file system. Another problem can exist when the destination file system has unusable storage blocks at locations that correspond to storage blocks used on the source file system. Yet another problem occurs when the RAID geometry of the source file system is different from that of the destination file system because the organization of storage blocks on the destination file system may not be organized as efficiently as on the source file system. These problems are among those addressed by the instant invention.

It would be advantageous to provide a technique that efficiently copies storage blocks from the source file system (arranged according to a first storage block arrangement) to the destination file system that is arranged according to a second storage block arrangement that differs from the first storage block arrangement.

SUMMARY OF THE INVENTION

The invention provides techniques for duplicating all or part of a file system while maintaining consistent copies of the file system. One preferred embodiment determines a first set of block numbers (BNs), determines where the storage blocks referenced by these BNs are to be stored, and updates the BNs accordingly. Another preferred embodiment reads data from the source file system (in accordance with a first storage block arrangement) creates an image stream and writes the data from the image stream onto the destination file system (in accordance with a second storage block arrangement). An intermediate storage medium can be used to store or transmit the image stream before writing the data to the destination file system. (For example, the intermediate storage medium can include (without limitation) a magnetic tape (or other archival device) or a network.) The invention allows image file system copies to be made from a source file system to a destination file system that has dissimilar characteristics from the source file system.

DESCRIPTION OF THE DRAWINGS

FIG. 3A illustrates a first block-list generation process in accordance with a preferred embodiment;

FIG. 3B illustrates a second block-list generation process in accordance with a preferred embodiment;

FIG. 3C illustrates a third block-list generation process in accordance with a preferred embodiment;

FIG. 4A illustrates a first image stream format generated using the process illustrated in FIG. 3A;

FIG. 4B illustrates a second image stream format generated according to FIG. 3B;

FIG. 4C illustrates a third image stream format generated according to FIG. 3C;

DESCRIPTION OF THE PREFERRED EMBODIMENTS

In the following description, one or more preferred embodiments of the invention are described with regard to preferred process steps and apparatus that effect these steps. However, those skilled in the art will recognize that embodiments of the invention may be implemented using special-purpose or general-purpose processors operating under program control or other circuits and that the implementation of the process steps would not require undue experimentation or further invention.

Inventions describe herein can be used in conjunction with inventions described in the following application:

application Ser. No. 08/471,218, filed Jun. 5, 1995, by David Hitz et al., titled A Method for Providing Parity in a Raid Sub-System Using Non-Volatile Memory, application Ser. No. 08/454,921, filed May 31, 1995, by David Hitz et al., titled Write Anywhere File-System Layout";

application Ser. No. 08/464,591, filed May 31, 1995, by David Hitz et al., titled Method for Allocating Files in a File System Integrated with a Raid Disk Sub-System.

Each of the above applications is hereby incorporated by reference as if fully set forth herein.

Notations and Nomenclature

The following 'notations and nomenclature' are provided to assist in the understanding of the present invention and the preferred embodiments thereof.

Block-type bits—Block-type bits are bits in a blockmap file that describe the purpose of each storage block in the file system. Thus, block-type bits can be used to determine which storage blocks contain block number (BN) pointers.

Pointer—A pointer is a data value that is used to reference a data structure. One skilled in the art will understand that "pointer" includes, without limitation, a memory address to, or a value used to calculate the address to the information of interest and any functional equivalents including handles and similar constructs. A BN pointer serves as a pointer to a storage block in a file system.

Procedure—A procedure is a self-consistent sequence of computerized steps that lead to a desired result. These steps are defined by one or more computer instructions. These steps are performed by a computer executing the instructions that define the steps. Thus, the term "procedure" can refer to a sequence of instructions, a sequence of instructions organized within a programmed-procedure or programmed-function, or a sequence of instructions organized within programmed-processes executing in one or more computers.

RAID—Redundant Array of Independent Disks.

DETAILED DESCRIPTION

Figure 1:
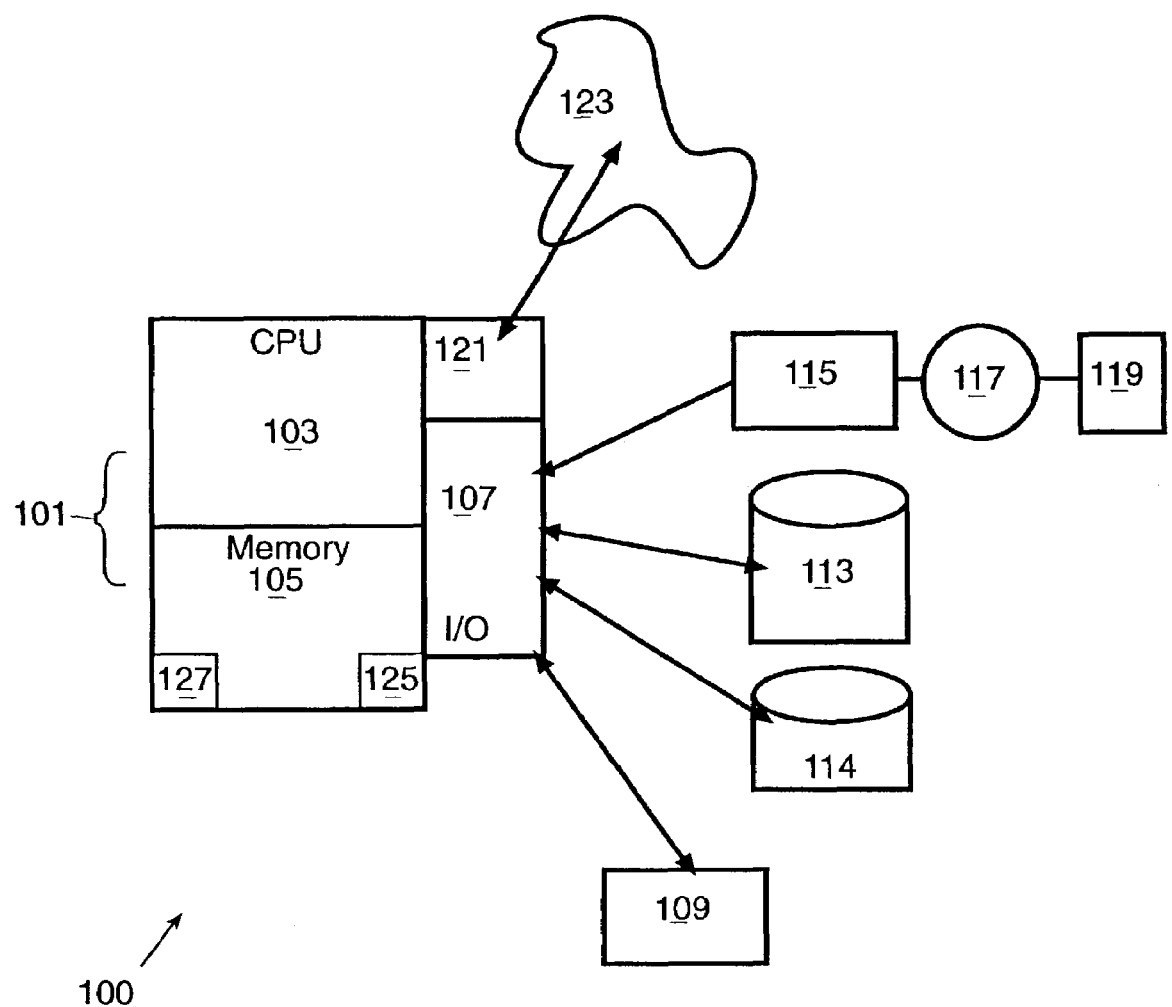
FIG. 1 illustrates a computer system capable of using the invention in accordance with a preferred embodiment.

FIG. 1 illustrates a computer, indicated by general reference character 100, that incorporates the invention. The computer 100 includes a processor 101 that incorporates a central processor unit (CPU) 103, a memory section 105 and an input/output (I/O) section 107. The I/O section 107 can be connected to an operator interface 109, a first disk storage unit 113, a second disk storage unit 114, and a removable media drive unit 115. The removable media drive unit 115 can read a removable medium 117 that typically contains a program and data 119. The disk storage units 113, 114 can be an array of disks (for example a RAID). The computer 100 can include a network interface 121 that connects the computer 100 to a network 123. An application program 125 residing in the memory section 105 causes the computer 100 to perform the steps of the invention. The application program 125 is loaded into the memory section 105 from one of the disk storage units, the network interface 121, a read only memory or similar data storage device. In some embodiments, the memory section 105 includes a NVRAM 127. The operator interface 109 provides access to the computer 100 such as through a network, terminal concentrator, or other I/O mechanism.

The removable media drive unit 115 (along with the removable medium 117), the first disk storage unit 113 and the second disk storage unit 114 are part of a file storage mechanism. The second disk storage unit 114 need not be the same size as the first disk storage unit 113 (in particular, the second disk storage unit 114 can have less data capacity than the first disk storage unit 113). In addition, the computer 100 can include a magnetic tape device (not shown). One skilled in the art will understand that not all the elements shown in FIG. 1 need be present for every embodiment.

One aspect of the invention transfers data from physical storage blocks that make up a source file system on a first block-oriented media to a second block-oriented media without requiring that the same physical block arrangement be used on the second block-oriented media as the first. Thus, a first storage block arrangement defines the file structure of the source file system and a second storage block arrangement defines the file structure of the destination file system and the first storage block arrangement and the second storage block arrangement are different.

Swizzling is a process that re-maps block numbers (BNs) so that file system storage blocks can be stored at different locations on the destination file system than they are on the source file system. Swizzling allows an image transfer from a first file system to a second file system when some of the storage blocks used on the first file system cannot be transferred to corresponding storage blocks on the second file system. This situation occurs (for example, but without limitation) when the first and second file systems are of differing sizes, when some storage blocks on the first file system cannot be transferred to the same storage blocks on the second file system (for example, if the second file system has bad blocks), or when the geometry of the file systems differ sufficiently to require a more optimal mapping (for example when transferring a file system from one RAID storage to another RAID storage having different properties).

Swizzling can be performed after the storage blocks are written to the destination file system (late swizzling) or as the storage blocks are being written to the destination file system (on-the-fly swizzling). Band swizzling is a form of late swizzling that optimizes writes to a RAID based destination file system and that optimizes the re-mapping step. Gob swizzling swizzles a range of storage blocks instead of a single storage block and so reduces the amount of block mapping information that is maintained. For example, if the gob size is 256 storage blocks, the BN of each block in the gob would have its upper bits swizzled in the same way, and the lower 8 bits of the BN would be left unchanged. This reduces the block mapping information by a factor of 256.

A preferred embodiment uses BNs that are within a volume block number (VBN) space. VBNs provide a contiguous flat address space for the storage blocks. This address space does not have gaps or holes where there is no storage block that corresponds to a given address (for example, some schemes that use a platter identification in the high bits of the address, and a storage block identifier within the platter will have address gaps between the platters).

Figure 2A:
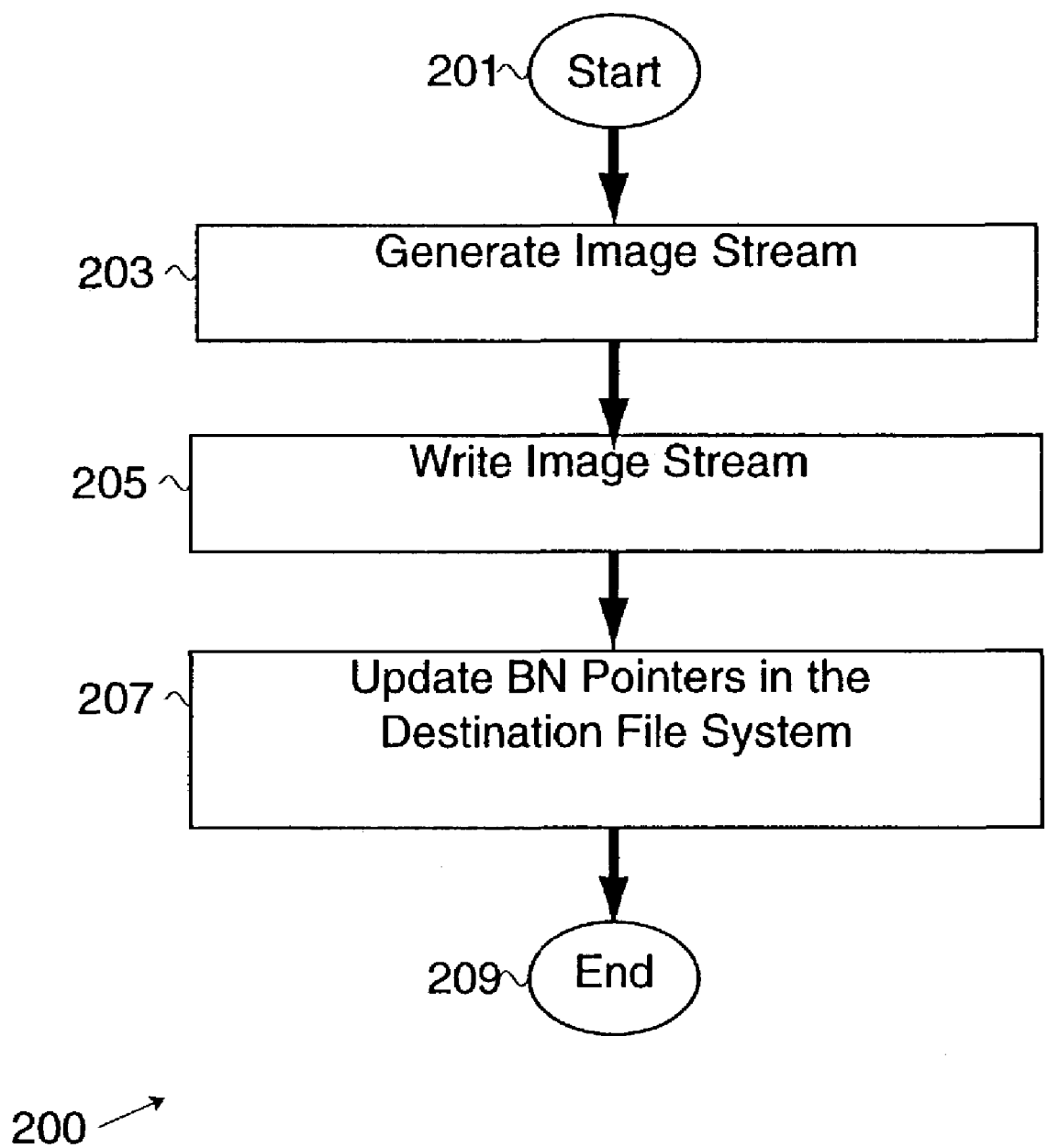
FIG. 2A illustrates an overview of the method of a preferred embodiment.

FIG. 2A illustrates a file system duplication process, indicated by general reference numeral 200, that transfers data from a source file system to a destination file system. Each file system is capable of storing the data in one or more storage blocks. The file system duplication process 200 initiates at a 'start' terminal 201 and continues to a 'generate image stream' procedure 203. The 'generate image stream' procedure 203 generates an image stream by determining a first storage block arrangement that specifies how/where the data stored on the source file system is located in the image stream. The 'generate image stream' procedure 203 also reads the data from the source file system in accordance with the first storage block arrangement to generate the image stream. A preferred embodiment scans the blockmap file to determine which storage blocks on the source file system are to be included in the image stream. Other embodiments can use other file system information to determine which storage blocks are to be included. Thus, the 'generate image stream' procedure 203 determines which storage blocks from the source file system are to be included in the image stream according to the arrangement of the storage blocks on the source file system as defined by the file system meta-data of the source file system. The arrangement of the storage blocks on the source file system is different from the arrangement of the storage blocks on the destination file system when the storage blocks are written.

The 'generate image stream' procedure 203 may also generate one or more block-lists that specify where storage blocks from the source file system are included in the image stream. The block-lists can indicate which storage blocks include one or more block number (BN) pointers. The data read from the source file system includes one or more block number (BN) pointers. The 'generate image stream' procedure 203 can also include a second block-list that can be used to map blocks in the image stream to a second storage block arrangement for the destination file system.

The image stream can include the block-type bits or information derived from the block-type bits to identify which storage blocks in the image stream include BN pointers.

Once the image stream is generated, a 'write image stream' procedure 205 determines the second storage block arrangement for the destination file system and writes the image stream to the destination file system using actual or normalized block-lists (implied block lists). One aspect of the invention is that data stored at a particular storage block on the source file system need not be stored at the same storage block on the destination file system. Thus, the arrangement of the storage blocks for the source and destination file systems can be different.

The block-lists can include information that can be used to directly map storage blocks from the source file system to storage blocks on the destination file system; and/or can include information that represents where the storage blocks are stored on the source and/or destination file system.

One aspect of the invention is that locations of the storage blocks on the source file system are different from the locations of the storage blocks on the destination file system. Thus, the data in a storage block having a given address on the source file system is stored in a storage block having a different address on the destination file system. Thus, the source file system need not have the same characteristics as the destination file system. In particular, these file systems need not have (without limitation) the same number of storage blocks, the same track/cylinder layout, or the same RAID parameters. In fact, the destination file system can even be smaller than the source file system so long as the data contained within the source file system can be stored on the destination file system.

Once the data is stored on the destination file system (as the second storage block arrangement), the file system duplication process 200 continues to an 'update BN pointers' procedure 207. The 'update BN pointers' procedure 207 uses the second storage block arrangement, the first block-list and, in some embodiments, the second block-list to update the BN pointers contained in the storage blocks in the destination file system. Once the BN pointers are swizzled, the destination file system contains a complete and consistent copy of the source file system at the time the image stream was created. The file system duplication process 200 completes through an 'end' terminal 209. The 'update BN pointers' procedure 207 can be accomplished after all the data has been written to the destination file system (late swizzling as is subsequently described with respect to FIG. 6 and such that the second storage block arrangement is determined prior to the late swizzling process) or at the same time as the data is being written to the destination file system (on-the-fly swizzling as is subsequently described with respect to FIG. 5 and such that the second storage block arrangement is defined during the on-the-fly swizzling process).

The 'update BN pointers' procedure 207 of FIG. 2A can be performed as a separate step after the storage blocks have been written to the destination file system. Alternatively, the 'update BN pointers' procedure 207 can be incorporated in the 'write image stream' procedure 205 such that the BN pointers are swizzled as the storage blocks are written to the destination file system.

In one preferred embodiment, the first block-list provides information as to how the image stream is organized. In another preferred embodiment, the image stream is organized according to a normalized format (or mapping) that is understood between the 'generate image stream' procedure 203, the 'write image stream' procedure 205, and the 'update BN pointers' procedure 207. FIG. 3A, FIG. 3B and FIG. 3C each illustrate different example mapping processes (without limitation) that can be used by the 'generate image stream' procedure 203 and the 'write image stream' procedure 205.

Figure 2B:
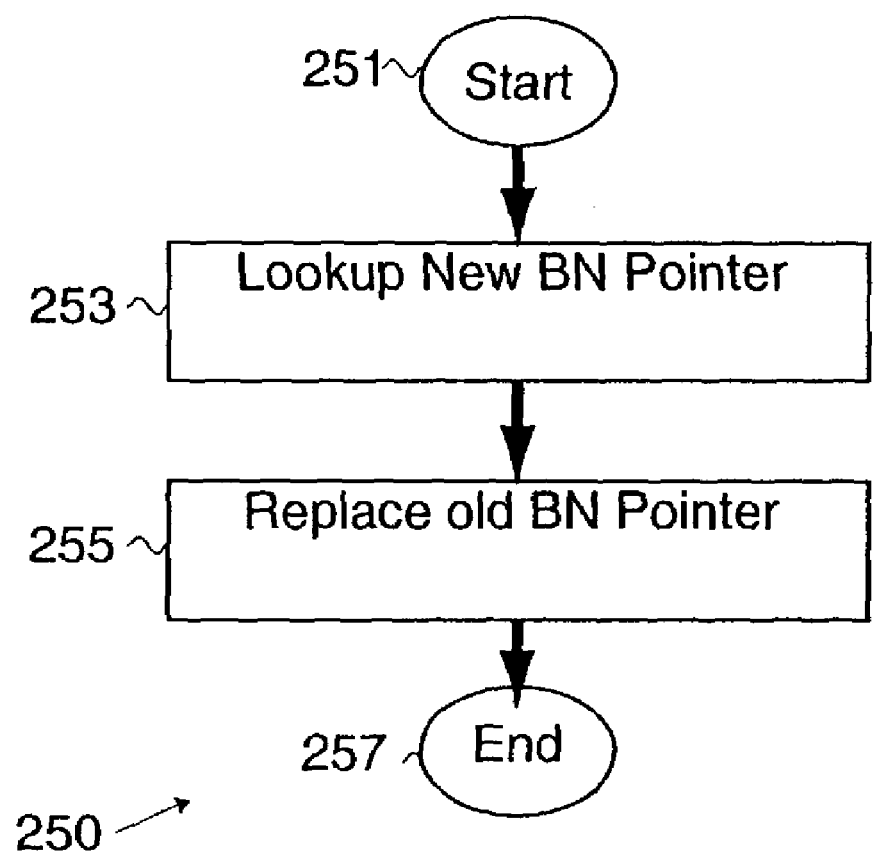
FIG. 2B illustrates a swizzling process used by a preferred embodiment.
Figure 5:
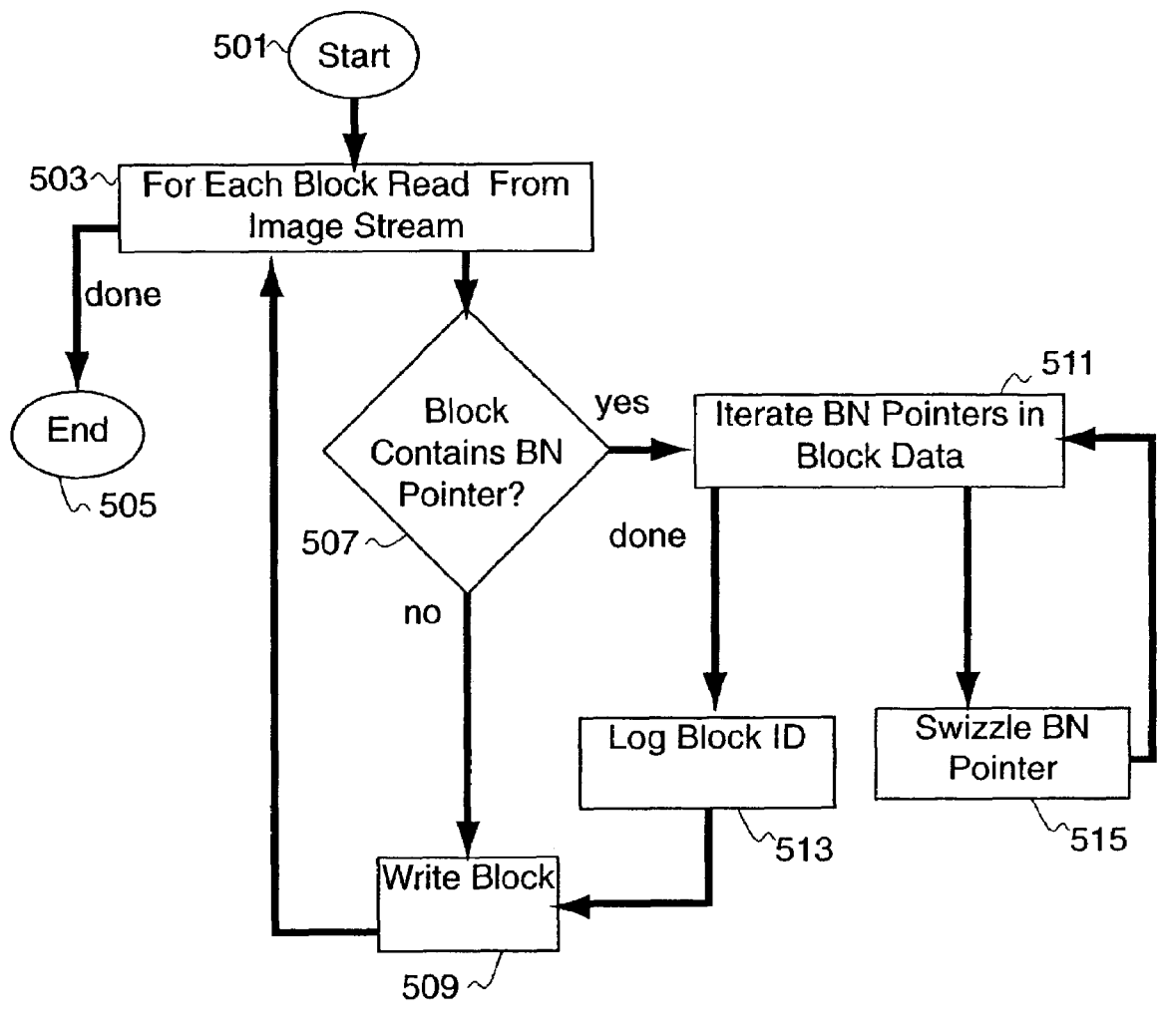
FIG. 5 illustrates an on-the-fly swizzling process in accordance with a preferred embodiment.
Figure 6:
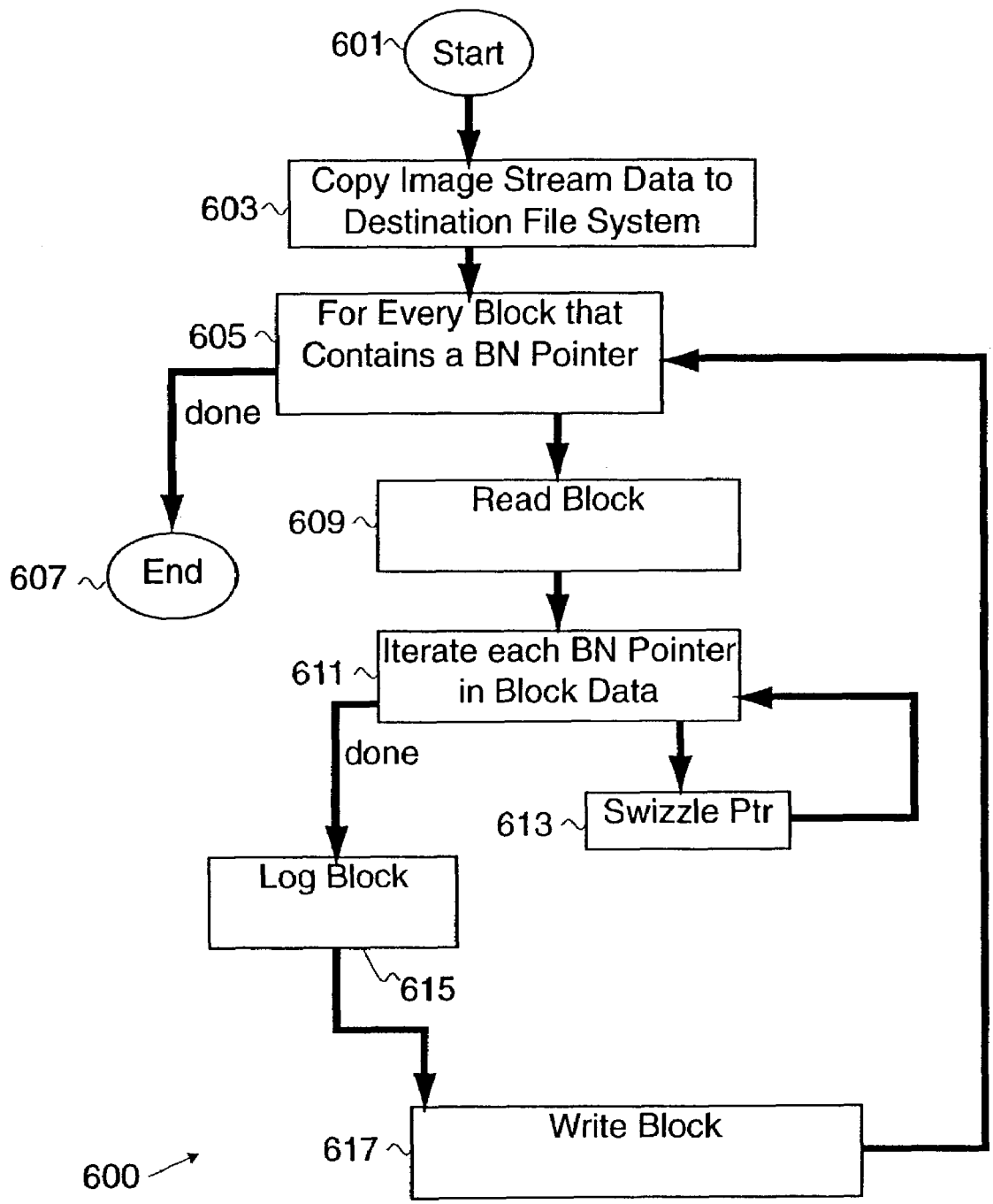
FIG. 6 illustrates a late swizzling process in accordance with a preferred embodiment.
Figure 7:
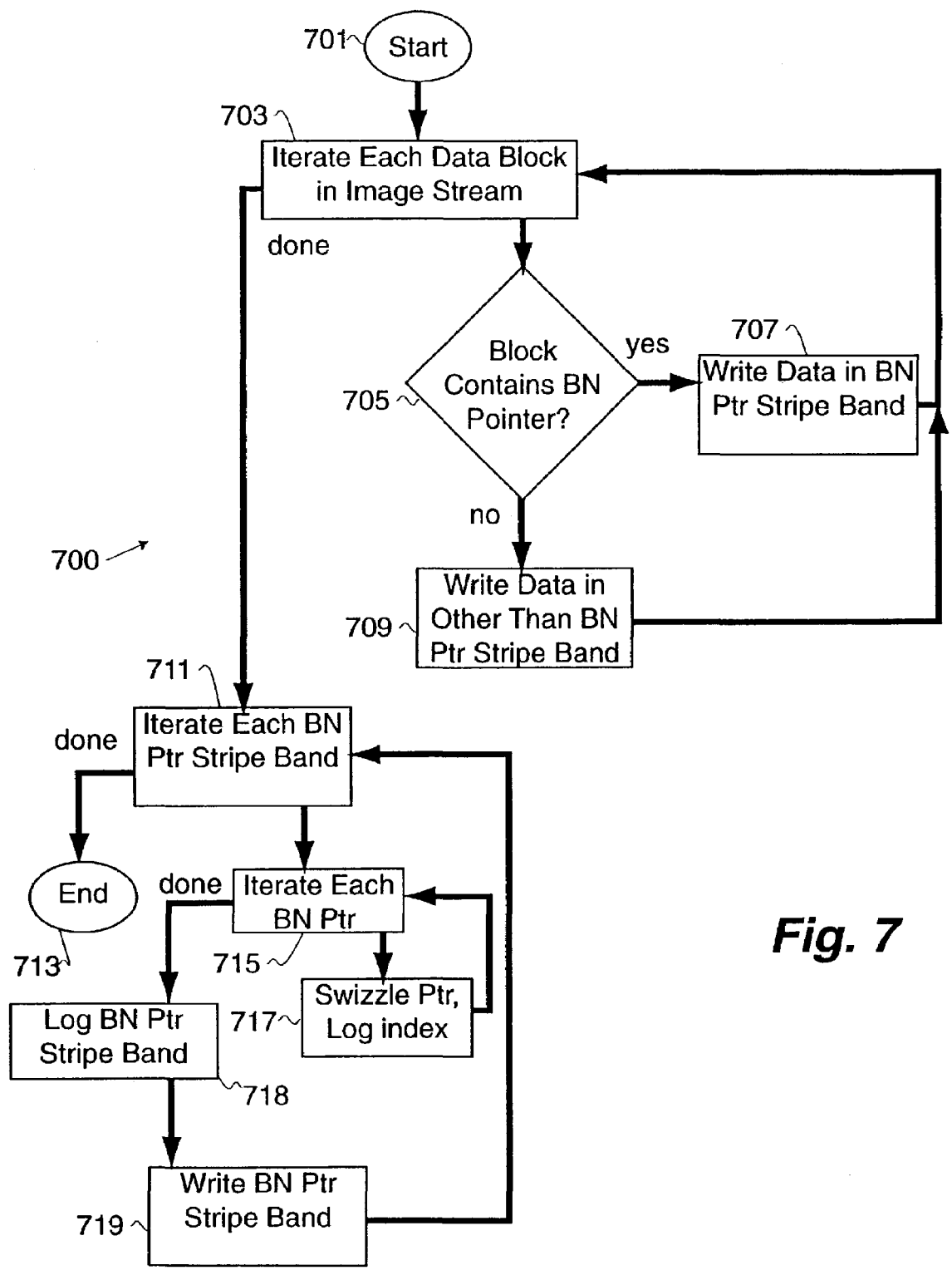
FIG. 7 illustrates a band swizzling process in accordance with a preferred embodiment.

FIG. 2B illustrates a swizzling process, indicated by general reference character 250, for mapping an old BN pointer from the source file system to a new BN pointer in the destination file system. The swizzling process 250 initiates at a 'start' terminal 251 and continues to a 'lookup new BN pointer' procedure 253 that uses the old BN pointer and the second block-list to retrieve the value of the new BN pointer for the destination file system. A 'replace old BN pointer' procedure 255 replaces the old BN pointer with the new BN pointer. One skilled in the art will understand that the second block-list need not be complete for this process. Instead, the second block-list can be constructed on-the-fly as the storage blocks are stored in the destination file system. The swizzling process 250 completes through an 'end' terminal 257. The swizzling process 250 is used by the subsequently described processes as shown in FIG. 5, FIG. 6, and FIG. 7.

The image stream contains explicit or implied information that maps the storage blocks from the source file system to the data in the image stream. Thus, the image stream is constructed in accordance with a specified format.

Block-type bits in the blockmap file can be used to determine which storage blocks contain BN pointers and which storage blocks do not. The BN pointers can be used to determine the first storage block arrangement—that is, to determine which storage blocks on the first disk storage unit 113 are to be included in the image stream. In addition, for file systems that do not use block-type bits, the storage blocks containing BN pointers can be determined by exploring the file system's meta-data. One skilled in the art will understand that block-type bits provide but one way for the invention to determine what the storage blocks in the source file system are used for. The block-type bits or other information representing which storage blocks contain BN pointers can be included in the image stream.

FIG. 3A illustrates a first block-list generation process, indicated by general reference numeral 300. The first block-list generation process 300 initiates at a 'start' terminal 301 and continues to a 'determine first block-list' procedure 303. The 'determine first block-list' procedure 303 scans the source file system to determine the first block-list using known techniques. A 'determine second block-list' procedure 305 determines the second storage block arrangement based on known characteristics of the destination file system. A 'store block lists with data' procedure 307 combines both the first block-list and the second block-list with the data to generate the image stream. The first block-list generation process 300 completes through an 'end' terminal 309. Thus, the computer that writes the image stream to the destination file system need not generate the second block-list because the computer that generated the image stream has already done so.

FIG. 3B illustrates a block-list generation process, indicated by general reference numeral 320, that initiates at an 'start' terminal 321 and continues to the 'determine first block-list' procedure 303 (previously described). Once the first block-list for the source file system is determined, the block-list generation process 320 continues to a 'store first block-list with data' procedure 325. The 'store first block-list with data' procedure 325 includes the first block-list with the image stream. However, unlike the first block-list generation process 300, the image stream does not contain the second block-list for the destination file system. After the image stream is created, the block-list generation process 320 continues to a 'create second block-list' procedure 327. The 'create second block-list' procedure 327 can be performed by the computer that writes the image stream to the destination file system. This computer uses information about the destination file system and the first block-list to generate the second block-list. The block-list generation process 320 completes through an 'end' terminal 329. One skilled in the art will understand that the 'create second block-list' procedure 327 can create the second block-list prior to, after, or concurrently with the storage of the image stream on the destination file system.

FIG. 3C illustrates a third block-list generation process, indicated by general reference numeral 350, that does not include the first block-list with the image stream. Instead, the image stream is created according to a normal-form block-list, known to both the computer creating the image stream from the source file system and the computer that receives the image stream, which writes the data contained in the image stream to the destination file system. This normal-form block-list can be created with the foreknowledge of the destination geometry or can be a block-list that is good enough for most geometries. The normal-form can include degenerate block-lists (for example but without limitation, block-lists that specify that a specified number of storage blocks were read from a first disk, then from a second disk, etc and repeating the sequence until all the storage blocks are read).

The third block-list generation process 350 initiates at a 'start' terminal 351 and continues to the 'determine first block-list' procedure 303. Next, a 'store data in normal-form' procedure 355 uses the first block-list to create the image stream in accordance with a normalized (implied and/or mutually understood) format. The computer that writes the data to the destination file system receives the image stream with the assumed the normal-form block-list and creates the second storage block arrangement for the destination file system at the 'create second block-list' procedure 327 (previously described). The third block-list generation process 350 completes through an 'end' terminal 359.

Each of the image streams generated by the previously described processes can be stored using intermediate storage such as (without limitation) a set of magnetic media. Each of the image streams can be sent from one computer to another using a communication mechanism such as (without limitation) a local area network or internet.

The 'create second block-list' procedure 327 can be performed by the source computer or the destination computer. If performed by the source computer, the source computer must know the characteristics of the destination file system.

The image stream formats that result from the processes shown in FIG. 3A, FIG. 3B, and FIG. 3C are shown in FIG. 4A, FIG. 4B, and FIG. 4C. FIG. 4A illustrates a first image stream format, indicated by general reference numeral 400, resulting from the first block-list generation process 300 of FIG. 3A. The first image stream format 400 contains a data portion 403, a first block-list portion 405, and a second block-list portion 407. The data portion 403 contains the data according to the first block-list (stored in the first block-list portion 405). The second block-list portion 407 contains the second block-list created by the 'determine second block-list' procedure 305 of FIG. 3A.

FIG. 4B illustrates a second image stream format, indicated by general reference numeral 450, that results from the block-list generation process 320 of FIG. 3B. In this case the second image stream format 450 includes the first block-list portion 405 and the data portion 403 but omits the second block-list portion 407.

FIG. 4C illustrates a third image stream format, indicated by general reference numeral 460, that results from the third block-list generation process 350 of FIG. 3C. In this case the third image stream format 460 does not contain the first block-list or the second block-list but does contain the data portion 403, which is stored according to a normalized format defined by an assumed normal-form block-list.

One advantage of the normalized format is that its use hides the source file system geometry from the destination computer.

In a preferred embodiment, the image stream contains information that identifies which of the image stream formats is used. This information can be placed in a header portion (not shown) of the image stream.

The image stream has been described (for simplicity) as having separate data and block-list portions. However, the image stream can have alternating block list and data portions.

One skilled in the art will understand that the first block-list and the second block-list can be combined to be a mapping between the storage blocks in the source file system and the storage blocks in the destination file system. Such a one will also understand that this is equivalent to the previously described embodiment where the first block-list describes where storage blocks are stored in the source file system and the second block-list describes where the storage blocks are stored on the destination file system. Both of these approaches (and other equivalent approaches) provide enough information for the invention to swizzle the storage blocks on the destination file system.

FIG. 5 illustrates an on-the-fly swizzling process, indicated by general reference numeral 500, that implements "on-the-fly swizzling". In on-the-fly swizzling, the BN pointers are swizzled while the image stream is being written to the destination file system. This type of swizzling updates the BN pointers as the storage blocks are written to the destination file system instead of performing the BN pointer update after all the storage blocks have been written. Thus, each block is only written once and often storage blocks can be arranged to be written in full RAID stripes. The on-the-fly swizzling process 500 initiates at a 'start' terminal 501 and continues to an 'iterate each block' procedure 503. The 'iterate each block' procedure 503 initially reads and stores any provided information that can be used to map the storage blocks between file systems (such as the first block-list portion 405 and the second block-list portion 407) and then reads each block from the image stream. When all storage blocks are read from the image stream, the on-the-fly swizzling process 500 completes through an 'end' terminal 505. A 'BN block' decision procedure 507 checks each storage block against the block information in the first block-list (or equivalent) to determine whether the storage block contains a BN pointer. If the storage block does not contain a BN pointer, the on-the-fly swizzling process 500 continues to a 'write block' procedure 509 that writes the block to the destination file system and the process continues to the 'iterate each block' procedure 503 to process additional storage blocks or to complete.

However, if at the 'BN block' decision procedure 507, the storage block is determined to have a BN pointer, the on-the-fly swizzling process 500 continues to an 'iterate BN pointers' procedure 511 that iterates each BN pointer in the block. After all the BN pointers in the block have been iterated, the process continues to a 'log block ID' procedure 513 that can store the block number of the modified block in a log (the actual swizzled block can be stored). Next, the on-the-fly swizzling process 500 continues to the 'write block' procedure 509 to store the block and continue processing as previously described. The logged block is used if the swizzling process must be restarted, as is subsequently described with respect to FIG. 8.

Once the swizzled block is written to disk by the 'write block' procedure 509, and if the swizzled block was logged by the 'log block ID' procedure 513, the swizzled block can be removed from the log or otherwise modified to show that the corresponding block on the destination device is complete while still retaining enough information to indicate which block was the last swizzled block. One skilled in the art will understand that for on-the-fly swizzling only the block numbers of the swizzled storage blocks need be logged as at restart, the original non-swizzled storage blocks are obtained from the source file system. Thus, logging which block was the last successfully swizzled block is sufficient for restarting on-the-fly swizzling.

The iterated BN pointer is processed by a 'swizzle BN pointer' procedure 515 that invokes the swizzling process 250 previously described with respect to FIG. 2B. The on-the-fly swizzling process 500 continues to the 'iterate BN pointers' procedure 511 to iterate additional BN pointers in the block or to complete as previously discussed. One skilled in the art will understand that the second block-list need not be completely constructed for this process. Instead, the second block-list can be constructed on-the-fly as the storage blocks are stored in the destination file system.

Swizzling on-the-fly can also be used with the normalized form of the image stream because the normalized form is deterministic. Swizzling on-the-fly cannot be used when the mapping between the first storage block arrangement and the second storage block arrangement is dynamically determined.

FIG. 6 illustrates a late swizzling process, indicated by general reference numeral 600, for performing late swizzling. In late swizzling, the BN pointers are swizzled after the image stream is written to the destination file system. The late swizzling process 600 is represented by the 'write image stream' procedure 205 and the 'update BN pointers' procedure 207 of FIG. 2A. The late swizzling process 600 initiates at a 'start' terminal 601 and continues to a 'copy image data' procedure 603. The 'copy image data' procedure 603 reads and stores any mapping information required by the image stream format (such as the first block-list portion 405 and the second block-list portion 407) and then writes the data in the data portion 403 of the image stream to the destination file system according to the second block-list. Once the data in the data portion 403 is written to the destination file system, the late swizzling process 600 continues to an 'iterate BN blocks' procedure 605 that iterates each block on the destination file system that contains a BN pointer from the source file system. These storage blocks are identified, for example, by the use of the first block-list (by the normal-form block-list, or, in the case of late swizzling, by the destination's blockmap file or destination file system's meta-data). When all of the BN storage blocks have been iterated, the late swizzling process 600 completes through an 'end' terminal 607.

As each BN block is iterated by the 'iterate BN blocks' procedure 605, the block is accessed by a 'read block' procedure 609 that brings the block of data into memory. Once the block of data is read, an 'iterate BN pointers' procedure 611 uses the information from the first block-list (or the normal-form block-list) to locate and iterate the BN pointers in the block. For each BN pointer, a 'swizzle pointers' procedure 613 uses the second block-list to determine where the block referenced by the BN pointer has been placed in the destination file system (thus determining the BN for the destination file system). This new BN is used to update the BN in the storage block in memory. The 'swizzle pointers' procedure 613 was previously described with respect to FIG. 2B. Once all the BN pointers in the block have been swizzled, the late swizzling process 600 continues to a 'log block' procedure 615 that stores information indicating that the block has been swizzled. Next, a 'write block' procedure 617 writes the block back to the destination file system and the late swizzling process 600 continues at the 'iterate BN blocks' procedure 605. Once the block has been successfully stored the block logged by the 'log block' procedure 615 can be removed from the log.

One skilled in the art will understand that there are many equivalents to the above sequence of operations that result in the BN storage blocks being swizzled.

Band Swizzling is a form of late swizzling that maps the BNs so as to optimize RAID performance both as storage blocks are first written to the RAID file system and during the swizzling of BN storage blocks. Band swizzling creates alternating bands of RAID stripes. One set of bands contains data that does not need to be swizzled (storage blocks), the other set of bands contains data that is to be swizzled (for example, inodes and indirect blocks). Thus, the stripes that contain storage blocks that need to be swizzled are read, swizzled, and written back to the stripe. Band Swizzling is used to improve performance when swizzling cannot be done completely on the fly. Band Swizzling is used when the mapping must be determined dynamically and cannot be known until the image stream has been entirely processed (for example when the mapping information is too large to hold in memory). Thus, multiple passes will be required to complete the swizzling process. By writing BN storage blocks to RAID stripes that do not contain data blocks subsequent passes can efficiently read the BN storage blocks.

FIG. 7 illustrates a band swizzling process, indicated by general reference numeral 700, used to separate blocks into band sets. The band swizzling process 700 initiates at a 'start' terminal 701 and continues to an 'iterate storage blocks' procedure 703. The 'iterate storage blocks' procedure 703 reads each storage block in the image stream. A 'BN block' decision procedure 705 examines each storage block and uses the first block-list (or the normal-form block-list) to determine whether the block contains BN pointers. If the block contains a BN pointer, the band swizzling process 700 continues to a 'write block in BN stripe' procedure 707 that writes the block to a RAID stripe belonging to a first set of stripe bands (allocated for BN blocks). However, if the block does not contain a BN pointer, the band swizzling process 700 continues to a 'write data in non BN stripe' procedure 709 that writes the storage block into a second set of stripe bands that does not contain storage blocks that contain BN pointers. After all the storage blocks in the image stream have been iterated by the 'iterate storage blocks' procedure 703, the band swizzling process 700 continues to an 'iterate each BN stripe' procedure 711 that reads each of the first set of stripe bands. When all of the first set of stripe bands are iterated, the band swizzling process 700 completes through an 'end' terminal 713.

As each of the first set of stripe bands is iterated, an 'iterate each BN pointer' procedure 715 uses the first block-list to iterate each BN pointer in the stripe. Each pointer is swizzled by a 'swizzle BN pointer' procedure 717 (as has been previously described with respect to FIG. 2B) and in addition, the index into BN is logged into NVRAM to assist with a possible restart. When all the BN pointers in the stripe have been swizzled, the band swizzling process 700 continues to a 'log BN ptr. stripe band' procedure 718 to log the storage blocks that have swizzled BN pointers. Next, the band swizzling process 700 continues to a 'write BN stripe' procedure 719 that overwrites the stripe with the storage blocks that contain the new BN pointers for the destination file system. The band swizzling process 700 continues to the 'iterate each BN stripe' procedure 711 to iterate other stripes or to complete.

The logged storage blocks are used, as is subsequently described with respect to FIG. 8, if the swizzling process must be restarted. In addition, the logged BN index indicates which BN was the one last swizzled. Once the ptr. stripe band has been successfully written to the destination file system, the logged ptr. stripe band can be removed from the log or otherwise marked as invalid while retaining enough information to restart.

If the swizzling process is terminated prior to updating all the storage blocks that contain BNs, some of the BNs will have been swizzled and others will not have been swizzled. Thus, the destination file system is in an inconsistent state. One problem with restarting the late swizzling processes is that the BN pointers must only be remapped once. One approach is to log the storage block that contains a swizzled BN in non-volatile RAM until that block has been verifiably written to the file system (some embodiments (for example, band sliding) may also need to store an index that indicates which BNs in the block have been swizzled). Another approach (that can be used with the band swizzling process 700) is to use band sliding. Band sliding reads storage blocks from one ptr. stripe band (a swizzle band) and writes the swizzled ptr. stripe band to a different stripe band. Thus, the data in the original ptr. stripe band is not modified. Band sliding is accomplished by initially allocating an empty swizzle band. Data from the first swizzle band that contains BN data is swizzled into the empty swizzle band leaving the data in the first swizzle band. Data from the second swizzle band is then swizzled into the first swizzle band and the process continues until all the swizzle bands are swizzled leaving an empty swizzle band. One embodiment initially leaves band 0 empty, stores BN storage blocks in band 1 to N, and writes data blocks in bands greater than N. During swizzling, the BN storage blocks from band 1 are read, swizzled, and written to band 0. BN storage blocks from band 2 are read, swizzled and written to band 1. This process continues until BN storage blocks from band N are read, swizzled and written to band N−1.

Restarting on-the-fly swizzling consists of locating the restart point in the image stream. In this case, the storage blocks can be processed twice because exactly the same mapping will occur on the second processing of the image stream. Thus, the log is used to locate a start point for resuming the swizzling process and for continuing the swizzling process from that point.

In late swizzling and band swizzling a block can only be updated once. In these processes, information is stored in the NVRAM such that swizzling can be correctly restarted.

Figure 8:
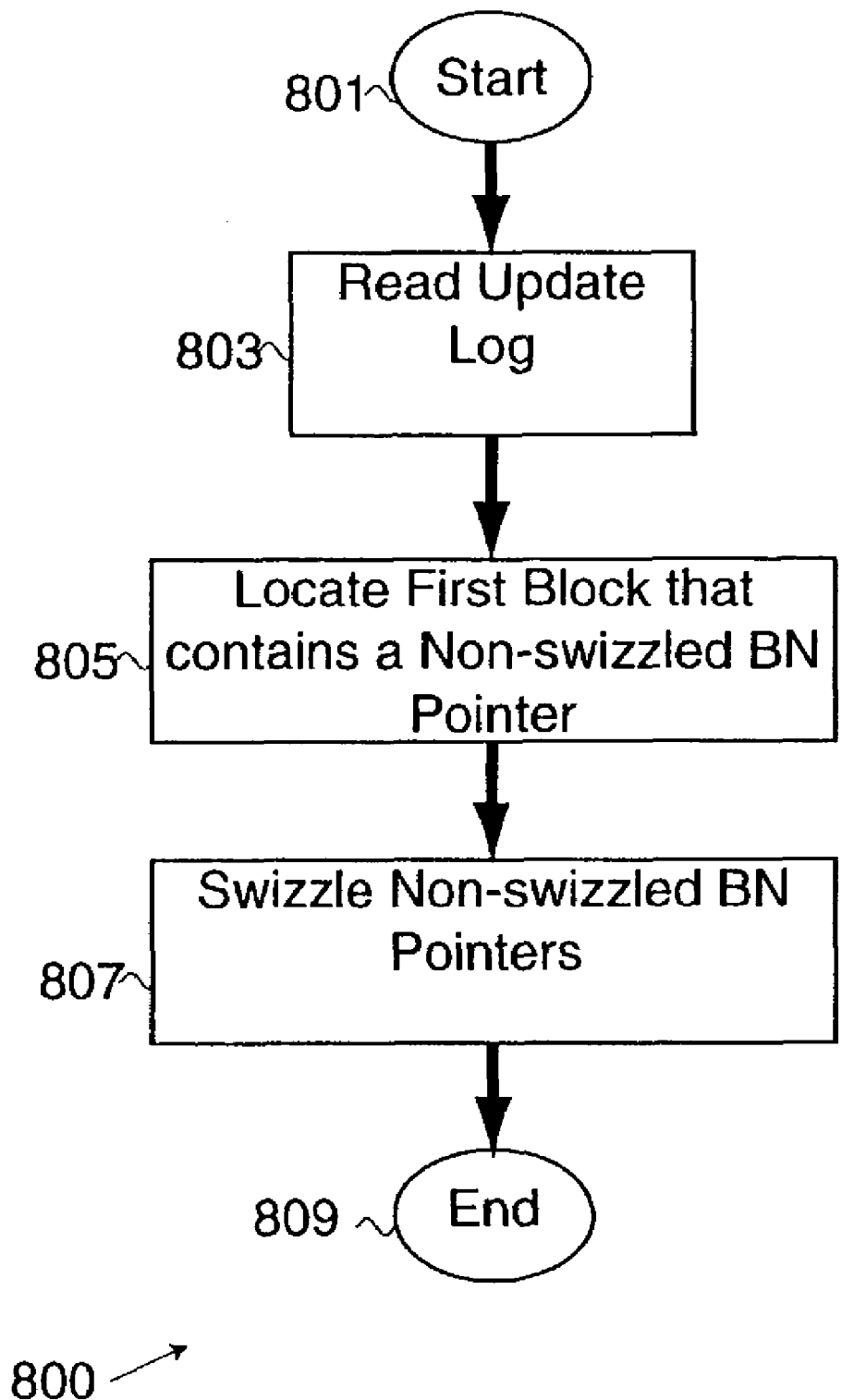
FIG. 8 illustrates a swizzle restart process in accordance with a preferred embodiment.

FIG. 8 illustrates a swizzle restart process, indicated by general reference numeral 800, used to restart an interrupted swizzle process (such as the late swizzling process 600, the on-the-fly swizzling process 500 and the band swizzling process 700). The swizzle restart process 800 is invoked after a swizzle process has been interrupted. The swizzle restart process 800 examines the swizzle log data to determine which BNs have been swizzled so as to continue swizzling non-swizzled BNs. The swizzle restart process 800 initiates at a 'start' terminal 801 and continues to a 'read update log' procedure 803. The 'read update log' procedure 803 reads the log from NV-RAM or gathers information from the swizzle bands. A 'locate non-swizzled BN' procedure 805 locates the first non-swizzled BN. If the log is stored in NV-RAM, the first non-swizzled BN is the first BN in the first storage block that contains a BN after the last logged storage block. For swizzling that uses band sliding, the first non-swizzled BN is determined by locating the two bands that contains copies of the same storage blocks—the first of these bands containing swizzled data and the second of these bands containing the non-swizzled data that can be overwritten. The subsequent swizzle band is then swizzled into the second of these bands. Thus, the swizzle restart process 800 skips the logged storage blocks. A 'swizzle non-swizzled BN ptrs.' procedure 807 then continues swizzling the non-swizzled BNs. The swizzle restart process 800 completes through an 'end' terminal 809.

In one preferred embodiment, the source file system and the destination file system are RAID devices with differing characteristics. The invention can optimize read and write operations to these devices by swizzling "gobs" instead of single storage blocks. This optimizes the writing of data into the destination file system. The use of gobs also reduces the size of the first block-list and the second block-list. A gob is an aggregation of storage blocks. One way to define gobs is by using the high order bits of a BN. However, other definitions can be used. Instead of mapping storage blocks from the source file system to the destination file system, gob-swizzling maps "gobs of data" from one file system to another. Often the source file system is organized such that storage blocks run sequentially (subject to possible interleaving) on each platter. Thus, a first platter would contain storage blocks 1−n while a second platter would contain storage blocks n+1−2*n and so on. A five-platter RAID (the actual RAID would often have additional platters for parity and error correction information) would be more efficient if the first five storage blocks of data from the first platter were placed in a RAID stripe. Thus, by appropriately selecting the size of the gobs to be a multiple of the size if the RAID stripe, the destination file system is written with high efficiency. Another advantage of gobs is that the sizes of the first block-list portion 405 and the second block-list portion 407 are reduced. Gobs can also be used in a gob-normal-form similar to the normal-form used with BNs.

Figures 9A, 9B:
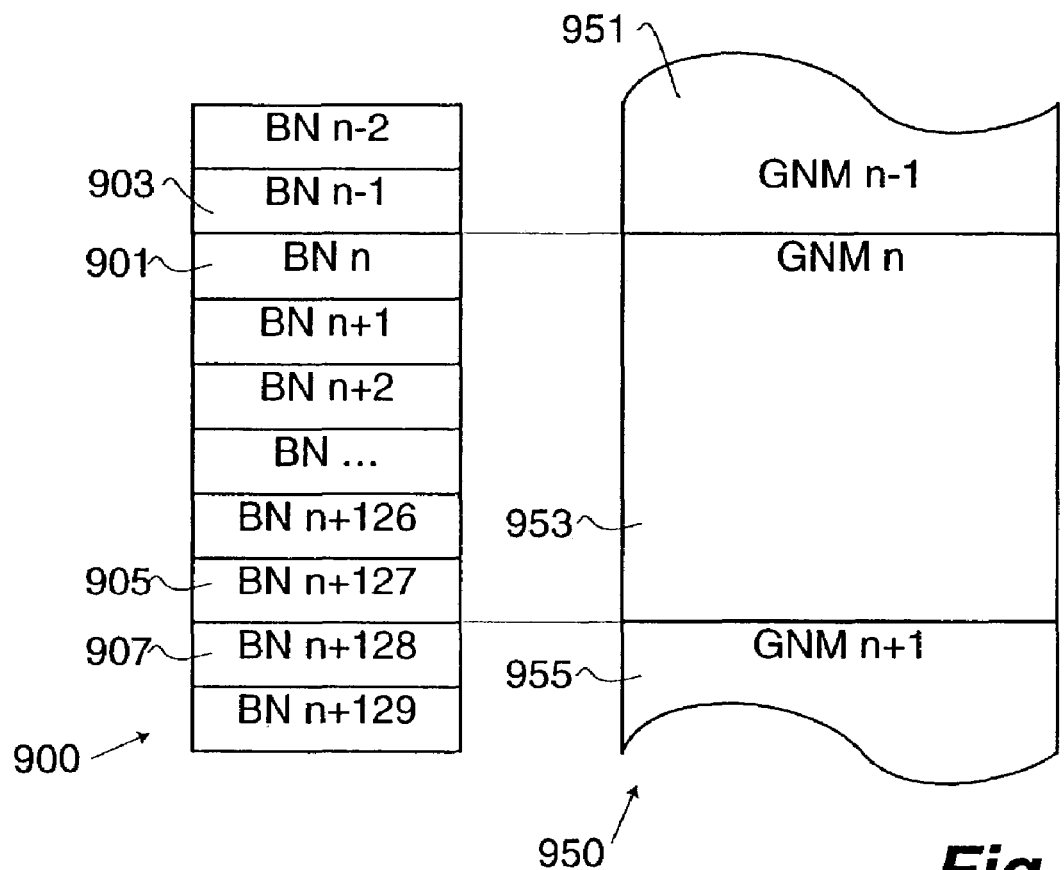
FIG. 9A illustrates a BN based image stream in accordance with a preferred embodiment.
FIG. 9B illustrates a gob based image stream in accordance with a preferred embodiment.

FIG. 9A and FIG. 9B illustrate the relationship between a BN based image stream, indicated by general reference numeral 900 and a gob based image stream, indicated by general reference numeral 950. The gist is that a gob contains a multiple of storage blocks.

The BN based image stream 900 is comprised of a sequence of storage blocks identified by BNs. The sequence of storage blocks contains an $n^{th}$ block 901, a prior block 903, a first subsequent block 905, and a second subsequent block 907. A gob boundary can occur between the $n^{th}$ block 901 and the prior block 903, and between the first subsequent block 905 and the second subsequent block 907. One skilled in the art will understand that a 128 storage block size gob is an example and that larger and smaller gob sizes can be used. In addition, the gob sizes need not be a multiple of two.

The gob based image stream 950 includes a prior gob 951, a gob 953, and a subsequent gob 955. Each gob is identified by a gob number (GNM) and contains the same number of storage blocks (except possibly the last gob). The boundary between the $n^{th}$ block 901 and the prior block 903 serves as the boundary between the prior gob 951 and the gob 953. The boundary between the first subsequent block 905 and the second subsequent block 907 serves as the boundary between the gob 953 and the subsequent gob 955. The number of storage blocks in the gob are preferably a multiple of the number of the data platters on a RAID device such that the data in a gob can be written to one or more RAID stripes in a single write operation. Thus, for the gob based image stream 950, each entry in the first block-list represents a gob having a plurality of the storage blocks. For the BN based image stream 900 each entry in the first block-list represents one or more of said storage blocks.

The invention can also be used to optimize a file system. Thus, for example but without limitation, the invention can be used to save an image of a file system to some intermediate format preparatory to changing the file system parameters (for example, by adding an additional RAID platter to the file system, by changing file system partitions, or simply to optimize the placement of storage blocks that contain BNs on the file system).

From the foregoing, it will be appreciated that the invention has (without limitation) the following advantages:

1) The invention enables a very fast image copy of a file system.
2) The invention enables a file system image to be copied from a larger file system to a smaller file system.
3) The invention enables a file system image to be copied from a larger file system to a destination file system even if the destination file system has defects.
4) The invention enables a file system to be optimized depending on the characteristics of the destination file system.

Although the present invention has been described in terms of the presently preferred embodiments, one skilled in the art will understand that various modifications and alterations may be made without departing from the scope of the invention. Accordingly, the scope of the invention is not to be limited only to the particular invention embodiments discussed herein.

What is claimed is:

1. A memory storing information including instructions, the instructions executable by a processor to perform a process to copy data from a source file system which has a first storage block arrangement to a destination file system which has a second storage block arrangement, said source file system and said destination file system each being capable of storing said data in one or more storage blocks, the process comprising:

writing an image stream to said destination file system in accordance with the second storage block arrangement, said second storage block arrangement being different from said first storage block arrangement, said data including one or more block number (BN) pointers; and swizzling said BN pointers in said storage blocks of said destination file system in accordance with said second storage block arrangement.

2. The memory of claim 1, wherein the step of swizzling is responsive to at least one block-type bit to determine which of said storage blocks to swizzle.

3. The memory of claim 1, wherein each of said BN pointers is within a volume block number space.

4. The memory of claim 1, wherein the process further comprises the step of reading said data from said source fife system in accordance with said first storage block arrangement to generate said image stream.

5. The memory of claim 4, wherein the step of reading further includes a step of including a first block-list in said image stream.

6. The memory of claim 4, wherein the step of reading further includes a step of including a second block-list in said image stream.

7. The memory of claim 4, wherein the step of reading further includes generating said image stream In accordance to a normal-form block-list.

8. The memory of claim 1, wherein the step of swizzling is performed after said image stream is written to said destination fife system.

9. The memory of claim 8, wherein the step of writing said image stream further includes steps of:

writing said storage blocks that contain said BN pointers in a first set of stripe bands; and writing said storage blocks that do not contain said BN pointers in a second set of stripe bands.

10. The memory of claim 1, wherein the step of swizzling further includes steps of:

logging information relating identifying the progress of the step of swizzling;

terminating the step of swizzling prior to updating all of said storage blocks; and restarting the step of swizzling using said information logged by the step of logging.

11. The memory of claim 1, wherein the step of swizzling is performed while said image stream is being written to said destination file system.

12. The memory of claim 1, wherein each entry in a first block-list represents at least one gob.

13. The memory of claim 1, wherein each entry in a first block-list represents at least one of said storage blocks.

14. The memory of claim 1, wherein said source file system and the destination file system are the same file system.

15. A processing system comprising a processor and a memory storing information including instructions, the instructions executable by the processor to perform a process to copy data from a consistent source file system which has a first storage block arrangement to a consistent destination file system which has a second storage block arrangement, said consistent source file system and said consistent destination file system each being capable of storing said data in one or more storage blocks, the process comprising:

writing an image stream received from said consistent source file system to said consistent destination file system in accordance with a second storage block arrangement, said second storage block arrangement being different from said first storage block arrangement, said data including one or more block number (BN) pointers; and swizzling said BN pointers in said storage blocks of said consistent destination file system in accordance with said second storage block arrangement.

16. The processing system of claim 15, wherein the step of swizzling is responsive to at least one block type bit to determine which of said storage blocks to swizzle.

17. The processing system of claim 15, wherein each of said BN pointers is within a volume block number space.

18. The processing system of claim 15, wherein the process further comprises the step of reading said data from said consistent source file system in accordance with said first storage block arrangement to generate said image stream.

19. The processing system of claim 18, wherein the step of reading further includes a step of including a first block list in said image stream.

20. The processing system of claim 18, wherein the step of reading further includes a step of including a second block list in said image stream.

21. The processing system of claim 18, wherein the step of reading further includes generating said image stream in accordance to a normal form block list.

22. The processing system claim 15, wherein the step of swizzling is performed after said image stream is written to said consistent destination file system.

23. The processing system of claim 22, wherein the step of writing said image stream further includes steps of:
  writing said storage blocks that contain said BN pointers in a first set of stripe bands; and
  writing said storage blocks that do not contain said BN pointers in a second set of stripe bands.

24. The processing system of claim 15, wherein the step of swizzling further includes steps of:
  logging information relating identifying the progress of the step of swizzling;
  terminating the step of swizzling prior to updating all of said storage blocks; and
  restarting the step of swizzling using said information logged by the step of logging.

25. The processing system of claim 15, wherein the step of swizzling is performed while said image stream is being written to said consistent destination file system.

26. The processing system of claim 15, wherein each entry in a first block list represents at least one gob.

27. The processing system of claim 15, wherein each entry in a first block list represents at least one of said storage blocks.

28. The processing system of claim 15, wherein said consistent source file system and the consistent destination file system are the same file system.

29. A method of copying data from a source file system which has a first storage block arrangement to a destination file system which has a second storage block arrangement, said source file system and said destination file system each being capable of storing said data in one or more storage blocks, the method comprising:
  writing an image stream to said destination file system in accordance with said second storage block arrangement, said second storage block arrangement being different from said first storage block arrangement, said data including one or more block number (BN) pointers; and
  swizzling said BN pointers in said storage blocks of said destination file system in accordance with said second storage block arrangement.

30. The method of claim 29, wherein said swizzling is responsive to at least one block-type bit to determine which of said storage blocks to swizzle.

31. The method of claim 29, wherein each of said BN pointers is within a volume block number space.

32. The method of claim 29, further comprising:
  reading said data from said source file system in accordance with said first storage block arrangement to generate said image stream.

33. The method of claim 32, wherein said reading further comprises:
  including a first block-list in said image stream.

34. The method of claim 32, wherein said reading further comprises:
  including a second block-list in said image stream.

35. The method of claim 32, wherein said reading further comprises:
  generating said image stream in accordance to a normal-form block-list.

36. The method of claim 29, wherein said swizzling is performed after said image stream is written to said destination file system.

37. The method of claim 36, wherein said writing said image stream further comprises:
  writing said storage blocks that contain said BN pointers in a first set of stripe bands; and
  writing said storage blocks that do not contain said BN pointers in a second set of stripe bands.

38. The method of claim 29, wherein said swizzling further comprises:
  logging information related to identifying the progress of said swizzling;
  terminating said swizzling prior to updating all of said storage blocks; and
  restarting said swizzling using said information logged by said logging.

39. The method of claim 29, wherein said swizzling is performed while said image stream is being written to said destination file system.

40. The method of claim 29, wherein each entry in a first block-list represents at least one gob.

41. The method of claim 29, wherein each entry in a first block-list represents at least one of said storage blocks.

42. The method of claim 29, wherein said source file system and the destination file system are the same file system.

* * * * *